United States Patent Office 3,261,777
Patented July 19, 1966

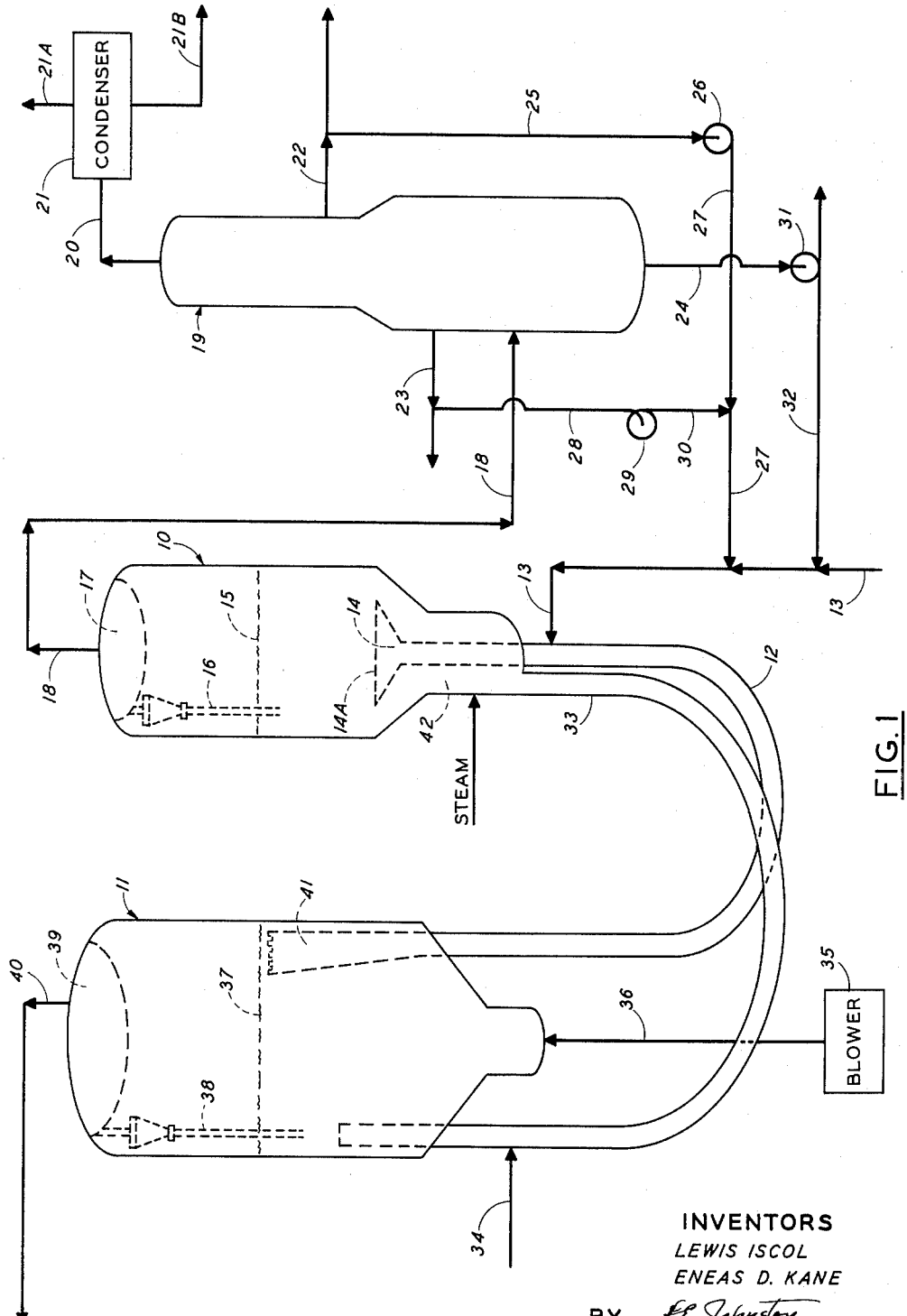

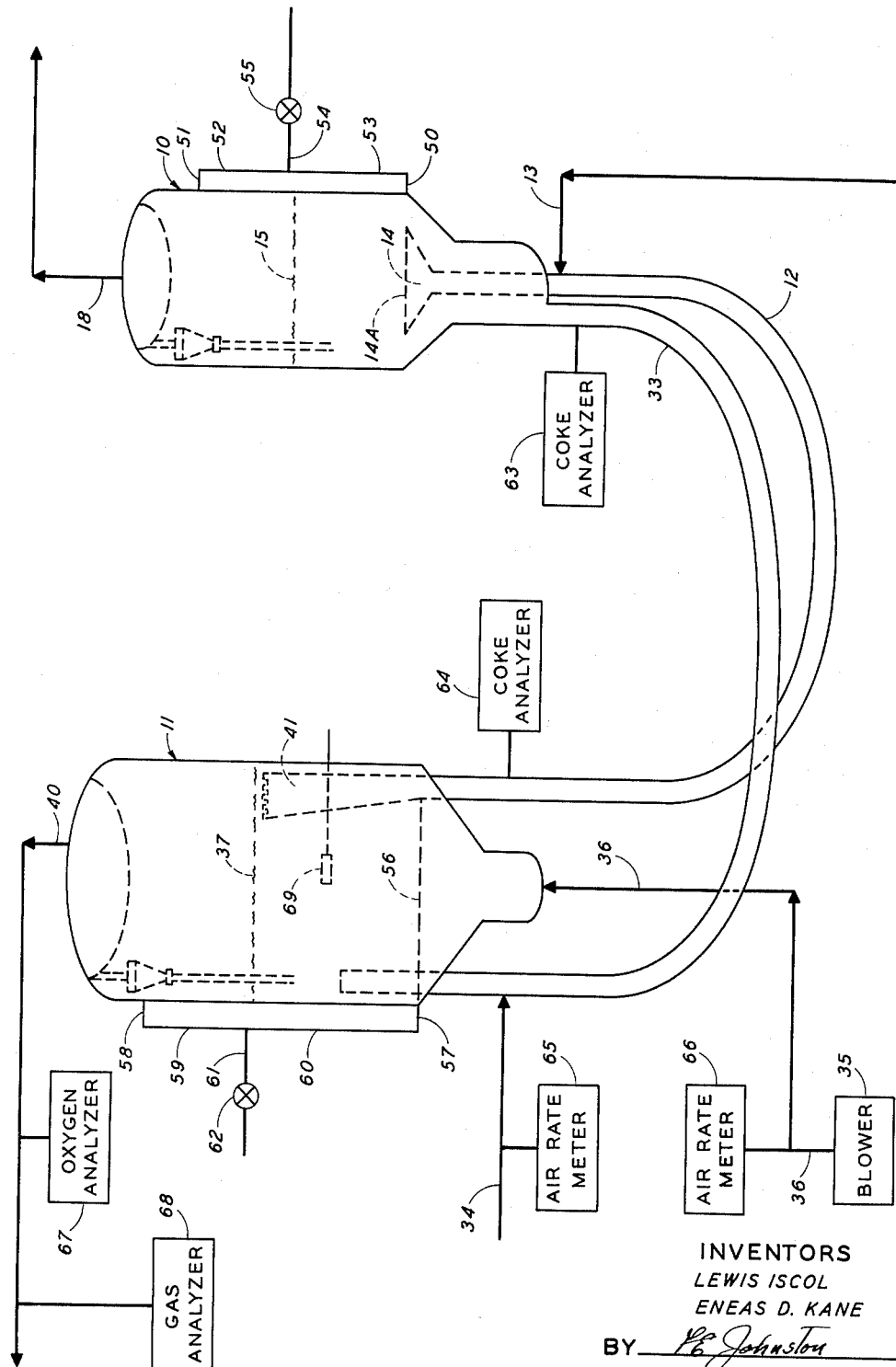

3,261,777
CONTROLLING COKE LAYDOWN IN A CATALYTIC CONVERSION PROCESS
Lewis Iscol, Albany, and Eneas D. Kane, El Cerrito, Calif., assignors to Chevron Research Company, a corporation of Delaware
Filed Aug. 14, 1962, Ser. No. 216,833
12 Claims. (Cl. 208—113)

This invention relates to a catalytic conversion process wherein hydrocarbon feed stocks are converted to more valuable products, as for example, by cracking to produce lower boiling products such as gasoline, diesel fuel and the like. The invention is especially directed to a catalytic cracking process wherein the rate of accumulation of carbonaceous deposits (coke) formed on the catalyst, or the lack thereof, is determined and employed as a guide for the improved operation of the cracking unit.

Although this invention is applicable in any moving bed or fluid catalyst system wherein coke formation on the catalyst exists and where regeneration of the catalyst by oxidation is required or desirable, for convenience the process will be described herein as employed in fluid cracking units since the invention is particularly suited for use in such a process.

Fluid catalytic cracking has been known and commercially employed for many years. Although a number of useful and economic physical process variations have been made over the years (e.g., reactor-regenerator spatial relationship, internal and external cyclones, U-bends and standpipes), the basic process has remained the same. In general, fresh feed (usually preheated) and at least one recycle stream are charged to a reactor inlet line where they pick up a regenerated catalyst from a regenerated-catalyst line or standpipe and are then passed into the reactor. Within the reactor the catalyst is maintained in a dense phase that, with respect to its physical properties, acts much like a liquid. All products are removed from the reactor in the vapor phase and pass to a products recovery section comprising a plurality of distillation columns for separation into the desired products. Portions of the catalyst in the reactor, coked by the cracking reaction, are continuously passed therefrom by a spent catalyst transfer line to the regenerator. In the regenerator the coke is burned from the catalyst (likewise maintained in a dense bed) by contact with an oxygen-containing gas. Flue gas is passed from the regenerator. The regenerated catalyst is then recirculated to the reactor by passing into the reactor inlet line.

The operation of such a process is not a simple matter, but is, instead, a complex balancing of many process variables. Thus, for any given unit, the operator must know the effect of such major process variables as feed composition (including recycle), feed temperature and rate, recycle rate, regenerating gas (oxygen) content and rate, system pressure, and catalyst activity and selectivity. Although some of these variables are directly measurable, some are not. As a result, the actual status of the system at any one moment, or in what direction and amount the system is deviating from steady state, is not actually known, largely because of the time lag involved for determining some of the quantities directly measured and for calculating those that cannot be directly measured. In short, there exists at this time no known method of operating a cracking unit by a precise guidance method. The operation currently involves a great deal of operator skill and experience on each particular unit and is generally considered an art. Thus, a particular unit will vary from its optimum operation from day to day or from crew shift to shift.

The present process is directed to a method of operating such units that provides a guidance to operation that takes out much of the guess work and experience that has characterized such operations in the past. Further, the process also provides a feature that current operating techniques cannot, namely the ability of the control system to anticipate and prognosticate the unit's future response to current and/or recent changes in process variables.

The present invention is directed to an improvement in a process for the catalytic conversion of a hydrocarbon feed stream wherein the stream, along with at least one recycle stream, is contacted with an active catalyst of definable activity and selectivity for such conversion in a reactor maintained under catalytic conversion conditions of temperature and pressure. In this reaction, the catalyst becomes contaminated by the deposition of coke thereon and the contaminated catalyst then is circulated from the reactor through a regenerator wherein the coke is burned, with the evolution of a flue gas, by contact with an oxygen-containing gas. This burning step regenerates the catalyst and elevates its temperature before returning it to the reactor. The reaction products are removed from the reactor and are separated into at least one product stream and at least one recycle stream. The improvement in such a process comprises:

(a) Producing a primary indicator signal CA indicative of the rate of coke accumulation upon the catalyst, said signal representing the mathematical relationship comprised of $$CA = M_R \dot{C}_R + M_G \dot{C}_G$$

wherein $M_R$ is the mass of catalyst in the reactor in pounds, $M_G$ is the mass of catalyst in the regenerator in pounds, $C_R$ is the coke content of the catalyst leaving the reactor in weight fraction, $\dot{C}_R$ is the first derivative of $C_R$ with respect to time in hours, $C_G$ is the coke content of the catalyst leaving the regenerator in weight fraction, and $\dot{C}_G$ is the first derivative of $C_G$ with respect to time in hours. Signals are produced indicative of the values of $M_R$, $M_G$, $\dot{C}_R$ and $\dot{C}_G$, and these signals are combined in accordance with said mathematical relationship to produce the primary indicator signal CA; and (b) Regulating at least one variable selected from the group consisting of feed composition, feed temperature, feed rate, recycle rate, oxygen-containing gas rate, reactor pressure, the amount of catalyst within the reactor-regenerator system, catalyst activity and catalyst selectivity to keep the primary indicator signal CA as near as possible to a desired value.

The key to the present invention resides in the determination and use of the primary indicator signal CA which represents the rate of accumulation (or lack thereof) with respect to time of coke on the catalyst in the overall reactor-regenerator system. Ideally, the coke laid down on the catalyst (over and above the equilibrium concentration of carbon thereon) in the reactor by the cracking reaction should be completely burned in the regenerator, with a resulting rise in the temperature of the catalyst returned to the reactor such that it furnishes the necessary heat for the endothermic cracking reaction in the reactor. Accordingly, the rate of coke accumulation on the catalyst should be zero), or as close to zero as it is possible to maintain. However, it may be desirable, for particular situations, to regulate CA at a value other than zero. The present invention describes how the coke accumulation values can be determined, how these values can be employed to operate applicable processing units, and, further, a method of prognosticating what these values will be in the future so that any necessary steps can be made to correct any significant divergence from a CA of zero or other desired control value.

The key signal of the present invention, i.e., the primary indicator signal CA, can be determined by several methods, all based upon direct measurement of some quantities, by the physical dimensions inherent in each particular unit, and by calculations based upon and derived from such measurements and physical dimensions. These methods will be described in detail as to a particular cracking unit which will be first described in conjunction with FIGURE 1. No attempt has been made to show all processing details and equipment in this figure since such are well known to those skilled in the art.

Referring now to FIGURE 1, the basic feature of the process is the continuous flow of catalyst between the reaction zone 10 and the regeneration zone 11. The catalyst, a finely divided synthetic or natural silica-containing powder, is mixed with appropriate amounts of gas, either steam, air or oil vapor, and transported in a fluidized state between regenerator 11 and reactor 10 by U-bend 12. In this particular process, there are no moving mechanical components handling the fluidized catalyst.

The feed stocks to the process generally consist of heavy gas oils recovered from vacuum strippers and the like. Typically, the boiling range is from about 450° to 1000° F. The fresh feed (along with recycle described below) is charged directly to U-bend 12 just before it enters reactor 10 by line 13. The hot catalyst vaporizes the feed on contact, and the catalyst-oil vapor mixture enters reactor 10 by distributor 14 having a grid 14A. The sudden increase in area upon entering reactor 10 causes the fluid velocity to drop, and the catalyst forms a dense phase (for example 45 lbs./cu. ft.) with a level 15. The hold up of the catalyst and oil vapor within reactor 10 is sufficient in time for the cracking reaction to take place. The vapor products pass overhead through at least one cyclone separator 16 (which returns the fine catalyst particles remaining in the vapor to the dense phase), thence through plenum chamber 17, and are then removed from reactor 10 by line 18. The products from reactor 10 pass as a vapor by line 18 to a fractionating column 19 wherein they are split, for example into an overhead product which is removed by line 20 and which is passed into condenser 21 wherein the normally gaseous componets are removed by line 21A and a gasoline product is removed by line 21B, a light cycle stock product which is removed by line 22, a heavy heart-cut product which is removed by line 23, and a fractionator bottoms which is removed by line 24. Normally, portions of the light cycle oil product, the heavy heart-cut cycle oil and the bottoms fraction are recycled to the reactor 10. In this case, the light cycle oil can be passed from line 22 to line 25 by pump 26 and line 27 into feed line 13. Portions of the heavy heart-cut cycle oil can be recycled to reactor 10 by lines 23 and 28, pump 29, lines 30 and 27 to feed line 13. Portions of the fractionator bottoms can be recycled by line 24, pump 31, and line 32 into feed line 13.

The catalyst within reactor 10 flows from the dense phase therein through a steam stripper zone 42 and a U-bend transfer line 33 to regenerator 11. Flow is maintained in line 33 by introducing air (by line 34) into the riser leg of line 33. In regenerator 11, the mixture of air (passed into regenerator 11 by line 34 and also from blower 35 by line 36) and catalyst form a dense phase bed similar to that in reactor 10. This dense bed in regenerator 11 has a level 37. The air burns off the carbon which has been deposited on the catalyst in reactor 10. The heat liberated in the reaction supplies the heat necessary to vaporize the feed and heat of cracking in reactor 10. The flue gases from the regeneration pass overhead through at least one cyclone separator 38 through plenum chamber 39 and then out of the regenerator 11 by line 40. Normally the flue gases passing from line 40 are passed to electrostatic precipitators (not shown) and thence to the atmosphere. The regenerated catalyst enters U-bend 12 over a weir into overflow well 41 located in the dense phase of the catalyst in regenerator 11.

The cracking reaction in reactor 10 is generally conducted at temperatures of from about 800° to 1100° F. and at pressures somewhat above atmospheric, for example, from 7 to 15 p.s.i.g. The catalysts ordinarily used are generally silica-containing clays or synthetic composites of metal oxides, and are normally composites of silica with one or more metal oxides such as alumina, zirconia, magnesia, titania, beryllia and the like.

The regenerator dense bed is normally maintained at a temperature of from about 1000° to 1250° F. and pressures about the same as in the reactor.

METHODS FOR THE DETERMINATION OF PRIMARY INDICATOR SIGNAL, CA

*Method A.*—In this method, the signal CA, indicative of the rate of the total coke accumulation upon the catalyst in the system, is represented, in pounds per hour, by the mathematical relationship comprised of:

$$CA = M_R \dot{C}_R + M_G \dot{C}_G$$

wherein $M_R$ is the mass of catalyst in the reactor in pounds;
$M_G$ is the mass of catalyst in the regenerator in pounds;
$C_R$ is the coke content of the catalyst leaving the reactor in weight fraction;
$\dot{C}_R$ is the first derivative of $C_R$ with respect to time in hours;
$C_G$ is the coke content of the catalyst leaving the regenerator in weight fraction;
$\dot{C}_G$ is the first derivative of $C_G$ with respect to time in hours.

$M_R$, $M_G$, $C_R$ and $C_G$ can be measured directly by previously calibrated instruments. The time derivatives of $C_R$ and $C_G$ are readily determined. The actual measurements can be determined in the following manner, with particular reference to FIGURE 2 which represents the reactor-regenerator system of FIGURE 1 except that it has been simplified so as to more clearly show how the various measurements can be made. For identical equipment, the same numbers in FIGURE 1 are carried on to FIGURE 2.

$M_R$, the mass of the catalyst in the reactor, can be actually determined from two quantities. The amount of catalyst above the reactor grid 14A can be measured by a pressure differential signal which indicates the effective "hydrostatic head" of the fluidized catalyst bed. The pressure difference can be measured between a tap 50 located level with reactor grid 14A and a tap 51 located in the dilute phase of reactor 10, well above the maximum dense bed level 15. This pressure difference is transmitted through lines 52, 53 and 54 to differential pressure indicator 55. Knowing the net cross-sectional area of reactor 10 and the pressure differential, the mass of the catalyst above reactor grid 14A is easily determined. The amount of catalyst in the riser section of U-bend 12 above the feed inlet line 13 is also included in the value $M_R$. This incremental amount of catalyst can be thought of as constant and can be obtained from the physical dimensions of the system and previously measured average density in this location. The summation of these two values is equal to $M_R$.

The amount of catalyst $M_G$ in the regenerator can be measured as follows. In regenerator 11, catalyst will be found only above grid 56. The amount of catalyst above the grid 56 is measured by pneumatic pressure difference signal in much the same manner as the reactor catalyst mass. Thus, the pressure difference is measured between a tap 57 located approximately level with grid 56 and a tap 58 located in the dilute phase in regenerator 11, again well above the maximum dense bed level 37. Pressure differential is transmitted through lines 59, 60 and 61 to differential pressure indicator 62. The amount of catalyst in regenrator 11 can be readily determined since the net cross-sectional area is known.

The measurement of $C_R$, the coke content of the catalyst leaving the reactor, can be determined in any manner. One method has been described in U.S. Patent 2,753,246 and reference to that patent will completely describe a procedure and apparatus suitable for use in the desired $C_R$ determination. Since this patent describes a particular apparatus that can be employed, only a brief description thereof will be used herein. Generally, the carbon-on-carbon analyzer described in the patent is based on the continuous withdrawal of a catalyst sample, precisely metering a portion of the sample, removing carbon from the metered sample by combustion and measuring the carbon dioxide derived from this combustion. Still another type of analyzer for determining the amount of coke on the catalyst can be found in U.S. Patent 2,984,542. Since these analyzers will perform the necessary $C_R$ determination, no attempt is made to show them in detail in the drawing. Accordingly, for the determination of $C_R$, the carbon analyzer is shown on the figure as analyzer 63 located on U-bend transfer line 33. Of course coke analyzer 63 can be located in any point in the system that will give a measure of the coke content of the stripped catalyst leaving reactor 10 and prior to its entrance into regenerator 11.

The determination of $C_G$, i.e., the coke content of the catalyst leaving the regenerator, can of course use the same type of coke analyzer as described above with respect to the determination of $C_R$. In FIGURE 2, it is shown as coke analyzer 64 located on U-bend 12. Again, the actual location of coke analyzer 64 can be varied to any location that will measure the amount of coke leaving regenerator 11 prior to its contact with feed and/or recycle.

The values of $\dot{C}_R$ and $\dot{C}_G$, indicating the first derivatives with respect to time (in hours) of the values of $C_R$ and $C_G$, can be readily calculated, as for example by noting the $C_R$ and $C_G$ values over a time period and curve fitting, such as with the use of well-known computer equipment (not shown in the figure).

*Method B.*—In this method, the primary indicator signal CA can be represented in pounds per hour by the mathematical relationship comprised of:

$$CA = \frac{(M_R)(M_G)}{CCR}(\ddot{C}_G) + (M_R + M_G)(\dot{C}_G) + \frac{M_R}{CCR}(\dot{C}_B)$$

wherein $M_R$ is the mass of catalyst in the reactor in pounds;
$M_G$ is the mass of catalyst in the regenerator in pounds;
CCR is the catalyst flow rate through the system in pounds per hour;
$C_G$ is the coke content of the catalyst leaving the regenerator in weight fraction;
$\dot{C}_G$ is the first derivative of $C_G$ with respect to time in hours;
$\ddot{C}_G$ is the second derivative of $C_G$ with respect to time in hours;
$C_B$ is the rate of coke burning in the regenerator in pounds per hour; and
$\dot{C}_B$ is the first derivative of $C_B$ with respect to time in hours.

$M_R$, $M_G$ and $C_G$ can be directly measured in the manner indicated in Method A above. Likewise, the first derivative of $C_G$ with respect to time ($\dot{C}_G$) and the second derivative of $C_G$ with respect to time ($\ddot{C}_G$) can be determined as described above.

CCR can be readily determined in a variety of ways, for example by direct measurement or by circulation from a heat balance on the regenerator, the envelope for which cuts the circulating catalyst lines. All items of the heat balance, except catalyst circulation rate, are known either by direct measurement or by previous engineering calculations.

The above Method B would allow CA calculation based upon a catalyst circulation rate that is constant, a situation that would exist in many commercial units. However, if the determination of CCR indicates that, for the particular process unit, the catalyst circulation rate is not constant, this fact can be taken into account in the CA determination by an expansion of Method B. Thus, with a non-constant CCR, two additional terms can be inserted in the mathematical relationship of Method B described above. The CA relationship can be represented then by the following:

$$CA = \frac{(M_R)(M_G)}{CCR}(\ddot{C}_G) + \left[M_R + M_G - \frac{M_R M_G C\dot{C}R}{(CCR)^2}\right]\dot{C}_G$$
$$+ \frac{M_R}{CCR}(\dot{C}_B) - \frac{M_R C\dot{C}R}{(CCR)^2}C_B$$

wherein $C\dot{C}R$ is the first derivative of CCR with respect to time in hours.

It might be noted that a non-constant CCR normally has little effect upon the desired CA value. In most situations, the effect can be disregarded and CA can be determined by Method B above, giving rise to a very close approximation, sufficient for most applications. However, it should be remembered that a constant CCR would eliminate the additional terms (because $C\dot{C}R$ would be zero) leaving the mathematical relationship of Method B.

It might also be noted that with a varying CCR, $M_R$ and/or $M_G$ may also vary. If so, these values would have to be treated as variables when differentiating as is done in the case of catalyst circulation rate (CCR), discussed above.

The value of $C_B$, the rate of coke burning in the regenerator in pounds per hour, cannot be determined by direct measurement at any single location in the system. Instead, it is derived using a material balance on oxygen (a well-known type of engineering calculation) which employs the direct measurement of several measurable quantities. As a specific example, $C_B$ can be derived from the following mathematical relationship:

$$C_B = \frac{RA[39.9 - 1.9(O_2)]}{\frac{100-H_2}{1+\frac{CO_2}{CO}}\left[\frac{CO_2}{CO}+0.5(1+0.01\ O_2)\right]+3H_2(1+0.01\ O_2)}$$

wherein

RA is the oxygen-containing gas flow rate to the regenerator in standard cubic feet per minute;
$O_2$ is the volume percent of oxygen in the flue gas;
$CO_2/CO$ is the volumetric ratio of $CO_2$ to CO in the flue gas; and
$H_2$ is the weight percent of hydrogen in the coke.

The air rate to the regenerator, RA, is the volumetric rate of air flow to the regenerator 11 and includes the values in lines 34 and 36. This RA value can be measured by rate indicator 65 on line 34 and rate indicator 66 on line 36. The indicators 65 and 66 can be conventional orifice meters, Venturi meters or the like.

The oxygen content of the flue gas, $O_2$, is measured on a dry basis by oxygen analyzer 67 located in flue gas line 40 leaving regenerator 11 and can be a conventional continuous analyzer as, for example, one known in the petroleum industry as a Hays analyzer.

The ratio of carbon dioxide to carbon monoxide in the flue gas can be measured by continuously or periodically analyzing the flue gas emanating from the regenerator 11 by line 40 by another gas analyzer 68. The gas analyzer 68 can be a conventional gas chromatograph, preferably having multiple columns, that will directly measure, on a dry basis, the carbon monoxide and carbon dioxide content of the flue gas. From these values, the carbon dioxide to carbon monoxide ratio can be readily calculated.

The weight percent of hydrogen in the coke burned from the catalyst in regenerator 11 can be determined as follows.

From the gas analyzers 67 and 68, the amount of oxygen, both free and combined with carbon, is known. The amount of oxygen present in the incoming air is likewise known. In all cases, the latter amount is greater than that recorded by the gas analyzers because the hydrogen present in the coke combines with oxygen to form water in the coke burning operation. The hydrogen content of the coke burned in the regenerator can then be determined by a stoichiometric calculation based upon this disappearance of oxygen.

The constants appearing in the $C_B$ relationship above are based upon stoichiometric relationships and conversion of units so as to present $C_B$ in the desired pounds per hour.

*Method C.*—This method of determining the primary indicator signal CA is very similar to that described above in Method B except that the coke content of the catalyst leaving the reactor, termed $C_R$, is employed rather than the coke content of the catalyst leaving the regenerator. The CA signal can be represented (in pounds per hour) by the mathematical relationship comrised of:

$$CA = \frac{(M_R)(M_G)}{CCR}(\ddot{C}_R) + (M_R + M_G)(\dot{C}_R) - \frac{M_G}{CCR}(\dot{C}_M)$$

wherein all of the symbols are identical to those explained in Methods A and B (including the units) and wherein the only new value is $\dot{C}_M$. $\dot{C}_M$ is the rate of coke make in the reactor in pounds per hour. $\dot{C}_M$ is the first derivative of $C_M$ with respect to time in hours.

The signals representing the values of $M_R$, $M_G$, CCR, $C_R$, $\dot{C}_R$ and $\ddot{C}_R$ can be obtained in the manners previously described in Methods A and B. However, $C_M$, the rate of coke make (carbon production on the catalyst in the reactor) is not directly measured, but can be determined from other directly measured variables. This is done by utilizing a mathematical relationship which describes the cracking process (and accompanying coke make) which takes place in the fluidized bed within reactor 10. This relationship is a mathematical model representing the physical system. The cracking process, and thus the coke-make reaction, is complex in that the following important factors are significant:

(1) The particular hydrocarbon composition of the feed to the reactor.

(2) The physical conditions within the reactor, including the temperature, pressure, residence time of the hydrocarbon material, and the ratio of the throughput rate of the catalyst (measured in pounds per hour) to the throughput rate of the hydrocarbons (also measured in pounds per hour).

(3) The properties of the catalyst, including both the size and composition distributions, the method of initial manufacture, and the conditions to which it has been subject since manufacture.

(4) The mixing pattern (residence time distribution) of both the catalyst particles and the hydrocarbons in the reactor.

It is apparent to a chemical engineer skilled in the refining art that the considerations listed above are not exhaustive. It is also apparent that many specific variations of such models can be formulated. In a particular situation, that model is selected which adequately describes those factors deemed to be important to the specific unit that is being considered.

A specific example of such a model that has been effectively employed in a commercial fluid cracking unit control system follows:

$$C_M = 0.1343(FF) \exp\left[K_1 + K_2(\%CV) + \frac{K_3}{T_R + 460} + K_4\frac{R_{LT} + R_{HC} + R_{FB}}{FF}\right]$$

wherein $C_M$ is the coke make in the reactor in pounds per hour,

FF is the metered fresh feed rate entering line 13 in barrels per operating day (b.p.o.d.),

*exp.* represents the exponential of the bracketed relationship,

%CV is the percent of the fresh feed entering reactor 10 that is converted by cracking to products boiling below the gasoline distillation end point. This quantity may be obtained directly from metered flow rates (fresh feed flow rate entering line 13 and the flow rates of the various products after fractionation in fractionator 19, e.g., lines 20, 22, etc.). Alternatively, a mathematical model similar to the one employed for $C_M$ itself can be used.

$T_R$ is the dense bed temperature in the reactor in degrees Fahrenheit, $R_{LT}$ is the metered flow rate (in b.p.o.d.) of the light recycle passed from fractionator 19 by lines 22, 25, 27 and 13 to reactor 10, $R_{HC}$ is the metered flow rate in (b.p.o.d.) of the heart cut or intermediate recycle passed from column 19 by lines 23, 28, 30, 27 and 13 to the reactor, $R_{FC}$ is the metered flow rate (in b.p.o.d.) of the fractionator bottoms recycle passed from column 19 by lines 24, 32 and 13 into the reactor, $K_1$, $K_2$, $K_3$ and $K_4$ are constants which depend upon the composition of the particular fresh feed passed into the reactor. Typical values for a fresh feed stream derived from a California crude oil are:

$K_1$ ---------------------------------------- −4.46
$K_2$ ---------------------------------------- 0.0323
$K_3$ ---------------------------------------- 6,070
$K_4$ ---------------------------------------- 0.0002

As in the case of Method B, the relationship representing Method C is based upon a constant catalyst circulation rate (CCR). If CCR is not constant, the CA determination can include two terms that take this fact into account. Thus, for a non-constant CCR, the CA relationship can be represented by the following:

$$CA = \frac{(M_R)(M_G)}{CCR}(\ddot{C}_R) + \left[M_R + M_G - \frac{M_R M_G C\dot{C}R}{(CCR)^2}\right]\dot{C}_R - \frac{M_G}{CCR}(\dot{C}_M) + \frac{M_R C\dot{C}R}{(CCR)^2}C_M$$

In most situations, the catalyst circulation rate is constant or sufficiently close to constant that the simpler CA determination can be employed. Again, if $M_G$ and/or $M_R$ also vary, the values can be treated as variables when differentiating.

*Method D.*—In this method, the primary indicator signal CA can again be represented by the mathematical relationship comprised of:

$$CA = \frac{(M_R)(M_G)}{CCR}(\ddot{C}_G) + (M_R + M_G)(\dot{C}_G) + \frac{M_R}{CCR}(\dot{C}_B)$$

In this case, all of the values for the various measurements are obtained in the same manner as in Method B (including the possible additional terms for variable catalyst calculation rate described there), except that $C_G$, the coke content of the catalyst leaving the regenerator, is not directly measured but can be determined from other directly measured variables. This is effected by employing a mathematical relationship which is a representation of the complex coke burning process which occurs in the fluidized bed within the regenerator. This relationship is basically a mathematical model representing the physical system. The actual kinetics of the coke burning process is very complex in that the following important factors must be considered:

(1) The mixing pattern and therefore the residence time distribution of individual catalyst particles within the fluidized bed.

(2) The distribution and mixing pattern of the oxygen-containing gas flow through said bed.

(3) The composition and nature of the coke deposition on the catalyst throughout the fluidized bed.

(4) The nature and mechanisms of the reactions involved in burning the coke off the catalyst.

To a skilled chemical engineer, it is apparent that other factors can be considered in the formulation of a mathematical model of the coke burning process in the fluidized bed of regenerator 11. It is also apparent that many variations of such models can be formulated, depending upon the degree of accuracy desired. A specific example of such a relationship that has been found to adequately describe a fluidized cracking unit of the type hereinbefore described can be simplified to the following relationship, defining $C_G$ in terms of the directly measured regenerator dense bed temperature, the oxygen content of the regenerator flue gas, and the flow rate to the regenerator of the oxygen-containing gas.

$$C_G = K_5 \left( \frac{RA \ln \frac{21}{O_2}}{T_G - 1000} \right)$$

The only direct measurement in this relationship that has not been defined before is the value $T_G$, which is the temperature within regenerator 11 in degrees Fahrenheit. This value, $T_G$, is the average dense bed temperature in regenerator 11 and is obtained by at least one thermocouple 69 located within the regenerator catalyst bed.

With respect to the constant, $K_5$, in the above $C_G$ representation, initialization of $K_5$ can be accomplished by a measurement of $C_G$ under suitable conditions and of corresponding values of the normally directly measured values. Such a relationship permits predicting the behavior of the system for conditions within a range of the initialization conditions. A value of $K_5$ that has operated successfully and one that is typical, is $8.81 \times 10^{-7}$.

As described, $C_G$ can be determined as can be the time derivatives $\dot{C}_G$ and $\ddot{C}_G$ by differentiation of the expression for $C_G$ and substitution of time derivatives for the directly measured values of $T_G$, $O_2$, etc. obtained as previously described.

Based upon the above methods of determining CA, it is apparent that the actual substitution of the values of the terms and solving for CA can be done by manual calculation. However, in order to realize the highly desirable advantage of rapid determinations, and the much closer unit control attendant thereto, the determination of CA is preferably done with the aid of a computer system, and even more preferably with an on-line computer. In this regard, the particular computer may be used directly to manipulate controllers (closed-loop control), or to guide the plant operators (open-loop control).

The following is a brief description of a specific example of a computer system that has been employed in controlling a commercial fluid cracking unit.

The values of specific measurements made in the process unit, such as temperature, flow rates, pressures, etc. (described hereinbefore) and which may be termed "input signals from the process," are passed by electrical or pneumatic signals in a conventional manner to a control house. Some of these input signals are electrical, such as from the thermocouples for measuring temperature, and produce signals in millivolts that can go directly to a terminal unit. Pneumatic signals, such as from flow-meters whose output signal is in terms of pounds per square inch of air, are converted to electrical signals by the use of a pressure-to-current (P/I) transducer. In the specific example, the transducer employed is a Model No. 1AB20–100, manufactured by Minneapolis-Honeywell Regulator Co. of Philadelphia, Pennsylvania. The electrical current signals produced in the transducer are then brought to the terminal unit and passed through a precision resistor to develop millivolt signals. The terminal unit acts as a connecting link between the cracking plant and the computer system. All of the necessary input signals are available to the computer system in an electrical form at the appropriate pair of terminals. These signals are then available for use in calculations by either conventional analog or digital computer systems.

In the specific example, the computer system, including the noted terminal unit and all of the subsequently described components, are performed by a digital on-line computer produced by International Business Machine Corporation of San Jose, California, and having a model number of 1720. The functions of the various components are described briefly below.

The input signals from the terminal unit are converted from an analog form to digits for use by the computer. Each signal scanned under control of the computer program is read at the terminal unit and processed by an analog-to-digital converter (ADC). The digital output is then transferred to the computer's memory file for use in calculations according to the preprogrammed computer instructions. The results calculated by the computer program then must follow a similar reverse path in order to provide the useful output. The digitized results are converted to an analog signal by a digital-to-analog converter (DAC). Each electrical output signal is connected to an appropriate pair of terminals in the terminal unit. When it is necessary to convert this electrical analog signal to a pneumatic output in order to display the result on a pneumatic instrument, the electrical signal is converted to air pressure by a current-to-pressure (I/P) transducer. In the particular example, a Minneapolis-Honeywell Model No. 1BA20–200 is employed. If the results are displayed on an electronic instrument, this transducer conversion step is unnecessary. An additional method of display of results is by typewriter output directly by the computer system.

Employing the above-described CA mathematical relationships, a primary indicator signal CA is produced by the computer system. In the particular example, the CA values so produced are electrical. In actual practice, the CA, or coke accumulation, value is transmitted to an indicator instrument from which the plant operators can, by visual observation of a strip chart, directly read the coke accumulation on the catalyst in the system. In its simplest form, the plant operators can then take control action by regulating at least one of the following variables: feed composition, feed temperature, feed rate, recycle rate, oxygen-containing gas rate to the regenerator, reactor pressure, catalyst inventory (the amount of catalyst within the reactor-regenerator system), and torch oil to the regenerator. By having the CA value available to them, the plant operators are able to maintain closer control of the cracking unit than they have heretofore. However, the actual computer program can carry the control scheme a further step. The computer can, based upon its calculations, make recommendations to the plant operators (open-loop operation) or control directly the key plant variables (closed-loop operation). These changes in plant operation not only correct for coke and/or heat accumulations (control), but also alter product distribution and/or production rates so as to maximize the value of the products (optimization).

One of the important features demonstrated by use of the coke accumulation value is the ability to predict future behavior of the cracking unit much more effectively than by existing direct plant measurements. Previously, the plant operators relied principally on the flue gas oxygen content leaving the regenerator and on reactor and regenerator temperature measurements, so as to adjust the plant to maintain coke and heat balances. From these direct measurements the operator was able to determine their direction of change, but only qualitatively their rate of change. The operator was normally unable to predict the net effect of any interacting changes, especially if some of the changes were partially compensating. Only the use of a computer describing the system by means of a mathematical model permits a rapid evaluation of conditions and a prediction indicative of the net effect of interacting changes. The direction and extent of adjustments required are indicated by the coke accumulation value produced.

The coke accumulation value has provided plant operators with a new index to plant behavior not previously available to them. The usefulness of the present process employing a computer system has been completely demonstrated by plant experience. In the system employed in the commercial unit described hereinbefore, the coke accumulation on the catalyst is determined approximately every three minutes and it is recorded and displayed on a strip chart. The plant operators rely on this value to tell them the degree of coke imbalance in the system, if one exists. Whether the operators run the plant manually or use the computer value (on either an open or closed loop basis), they have found the coke accumulation value to be a completely reliable indication of the present and future behavior of the plant. Control action taken to correct indicated coke accumulation has consistently confirmed the accuracy of the computer, even when the previous individual direct measurements, such as flue gas oxygen content, did not appear in agreement. The coke accumulation value has provided the plant operators with increased "lead time" for adjusting plant operation for better control. It has prognosticated the system coke balance minutes in advance of the "after-the-fact" indications afforded by previously employed direct measurements. Coke accumulation control has allowed an increased conversion of fresh feed to desirable products. This is made possible by the improved plant control resulting from the determination and use of the coke accumulation value.

It is obvious to one skilled in the art that a number of modifications can be made in the subject process without departing from the scope and spirit of the claims. Thus modifications in the manipulation of the differential equations are possible, but such equations will always represent and take into account the fact that the coke content of the catalyst is not constant, and further that the rate of change of this coke content, with time, is of fundamental importance to the process of the type descibed and claimed.

We claim:

1. In a process for the catalytic conversion of a hydrocarbon feed stream wherein said stream, along with at least one recycle stream, is contacted with an active catalyst of definable activity and selectivity for said conversion, in a reactor maintained under catalytic conversion conditions of temperature and pressure, said catalyst becoming contaminated by the deposition of coke thereon, and said contaminated catalyst being circulated from said reactor through a regenerator wherein said coke is burned, with the evolution of a flue gas, by contact with an oxygen-containing gas, thereby regenerating the catalyst and elevating its temperature before its return to said reactor, and wherein reaction products are removed from said reactor and are separated into at least one product stream and at least one recycle stream, the improvement in such process which comprises:

(a) producing a primary indicator signal CA indicative of the rate of coke accumulation upon the catalyst in the over-all reactor-regenerator system, said signal representing the mathematical relationship comprised of $$CA = M_R \dot{C}_R + M_G \dot{C}_G$$

wherein $M_R$ is the mass of catalyst in the reactor in pounds,
$M_G$ is the mass of catalyst in the regenerator in pounds,
$C_R$ is the coke content of the catalyst leaving the reactor
$\dot{C}_R$ is the first derivative of $C_R$ with respect to time in hours,
$C_G$ is the coke content of the catalyst leaving the regenerator in weight fraction, and
$\dot{C}_G$ is the first derivative of $C_G$ with respect to time in hours;

producing signals indicative of the values of $M_R$, $M_G$, $\dot{C}_R$ and $\dot{C}_G$; combining said signals $M_R$, $M_G$, $\dot{C}_R$ and $\dot{C}_G$ in accordance with said mathematical relationship to produce said primary indicator signal CA; and (b) regulating at least one of the process variables of feed composition, feed temperature, feed rate, recycle rate, oxygen-containing gas rate, reactor pressure, the amount of catalyst within the system, catalyst activity and catalyst selectivity to keep said primary indicator signal CA as near as possible to a desired value.

2. The process of claim 1, wherein said primary indicator signal CA is kept as near as possible to zero.

3. In a process for the catalytic conversion of a hydrocarbon feed stream wherein said stream, along with at least one recycle stream, is contacted with an active catalyst of definable activity and selectivity for said conversion, in a reactor maintained under catalytic conversion conditions of temperature and pressure, said catalyst becoming contaminated by the deposition of coke thereon, and said contaminated catalyst being circulated from said reactor through a regenerator wherein said coke is burned, with the evolution of a flue gas, by contact with an oxygen-containing gas, thereby regenerating the catalyst and elevating its temperature before its return to said reactor, and wherein reaction products are removed from said reactor and are separated into at least one product stream and at least one recycle stream, the improvement in such process which comprises:

(a) producing a primary indicator signal CA indicative of the value of the rate of coke accumulation upon the catalyst in the over-all reactor-regenerator system, said signal representing the mathematical relationship comprised of:

$$CA = M_R \dot{C}_R + M_G \dot{C}_G$$

wherein $M_R$ is the mass of catalyst in the reactor in pounds,
$M_G$ is the mass of catalyst in the regenerator in pounds,
$C_R$ is the coke content of the catalyst leaving the reactor in weight fraction,
$\dot{C}_R$ is the first derivative of $C_R$ with respect to time in hours,
$C_G$ is the coke content of the catalyst leaving the regenerator in weight fraction, and
$\dot{C}_G$ is the first derivative of $C_G$ with respect to time in hours;

producing signals indicative of the measurement of $M_R$, $M_G$, $C_R$ and $C_G$; producing signals indicative of the values of $\dot{C}_R$ and $\dot{C}_G$; combining said signals $M_R$, $M_G$, $\dot{C}_R$ and $\dot{C}_G$ in accordance with said CA mathematical relationship to produce said primary indicator signal CA; and (b) regulating at least one of the process variables of feed composition, feed temperature, feed rate, recycle rate, oxygen-containing gas rate, reactor pressure, the amount of catalyst within the system, catalyst activity and catalyst selectivity to keep said primary indicator signal CA as near as possible to a desired value.

4. The process of claim 3, wherein siad primary indicator signal CA is kept as near as possible to zero.

5. In a process for the catalytic conversion of a hydrocarbon feed stream wherein said stream, along with at least one recycle stream, is contacted with an active cracking catalyst of definable activity and selectivity for said conversion, in a reactor maintained under catalytic conversion conditions of temperature and pressure, said catalyst becoming contaminated by the deposition of coke thereon, and said contaminated catalyst being circulated from said reactor through a regenerator wherein said coke is burned, with the evolution of a flue gas, by contact with an oxygen-containing gas, thereby regenerating the catalyst and elevating its temperature before its return to said reactor, and wherein reaction products are removed from said reactor and are separated into at least one product stream and at least one recycle stream, the improvement in such process which comprises:

(a) producing a primary indicator signal CA indicative of the value of the rate of coke accumulation upon the catalyst in the over-all reactor-regenerator system, said signal representing the mathematical relationship comprised of:

$$CA = \frac{(M_R)(M_G)}{CCR}(\ddot{C}_G) + (M_R + M_G)(\dot{C}_G) + \frac{M_R}{CCR}(\dot{C}_B)$$

wherein $M_R$ is the mass of catalyst in the reactor in pounds,
$M_G$ is the mass of catalyst in the regenerator in pounds,
CCR is the catalyst flow rate through the system in pounds per hour,
$C_G$ is the coke content of the catalyst leaving the regenerator in weight fraction,
$\dot{C}_G$ is the first derivative of $C_G$ with respect to time in hours,
$\ddot{C}_G$ is the second derivative of $C_G$ with respect to time in hours,
$C_B$ is the rate of coke burning in the regenerator in pounds per hour, and
$\dot{C}_B$ is the first derivative of $C_B$ with respect to time in hours;

producing signals indicative of the values of $M_R$, $M_G$, CCR, $\dot{C}_G$, $\ddot{C}_G$ and $\dot{C}_B$; combining said produced signals $M_R$, $M_G$, CCR, $\dot{C}_G$, $\ddot{C}_G$ and $\dot{C}_B$ in accordance with said CA mathematical relationship to produce said primary indicator signal CA; and (b) regulating at least one of the process variables of feed composition, feed temperature, feed rate, recycle rate, oxygen-containing gas rate, reactor pressure, the amount of catalyst within the system, catalyst activity and catalyst selectivity to keep said primary indicator signal CA as near as possible to a desired value.

6. The process of claim 5, wherein said primary indicator signal CA is frequently produced and is kept as near as possible to zero.

7. In a process for the catalytic conversion of a hydrocarbon feed stream wherein said stream, along with at least one recycle stream, is contacted with an active cracking catalyst of definable activity and selectivity for said conversion, in a reactor maintained under catalytic conversion conditions of temperature and pressure, said catalyst becoming contaminated by the deposition of coke thereon, and said contaminated catalyst being circulated from said reactor through a regenerator wherein said coke is burned, with the evolution of a flue gas, by contact with an oxygen-containing gas, thereby regenerating the catalyst and elevating its temperature before its return to said reactor, and wherein reaction products are removed from said reactor and are separated into at least one product stream and at least on recycle stream, the improvement in such process which comprises:

(a) producing a primary indicator signal CA indicative of the value of the rate of coke accumulation upon the catalyst in the over-all reactor-regenerator system, said signal representing the mathematical relationship comprised of:

$$CA = \frac{(M_R)(M_G)}{CCR}(\ddot{C}_G) + (M_R + M_G)(\dot{C}_G) + \frac{M_R}{CCR}(\dot{C}_B)$$

wherein $M_R$ is the mass of catalyst in the reactor in pounds,
$M_G$ is the mass of catalyst in the regenerator in pounds,
CCR is the catalyst flow rate through the system in pounds per hour,
$C_G$ is the coke content of the catalyst leaving the regenerator in weight fraction,
$\dot{C}_G$ is the first derivative of $C_G$ with respect to time in hours,
$\ddot{C}_G$ is the second derivative of $C_G$ with respect to time in hours,
$C_B$ is the rate of coke burning in the regenerator in pounds per hour, and
$\dot{C}_B$ is the first derivative of $C_B$ with respect to time in hours;

producing signals indicative of the values of $M_R$, $M_G$, CCR, $\dot{C}_G$ and $\ddot{C}_G$; producing a signal indicative of the value of $C_B$ wherein $$C_B = \frac{RA[39.9 - 1.9(O_2)]}{\frac{100 - H_2}{1 + \frac{CO_2}{CO}}\left[\frac{CO_2}{CO} + 0.5(1 + 0.01 O_2)\right] + 3H_2(1 + 0.01 O_2)}$$

wherein

RA is the oxygen-containing gas flow rate to the regenerator in standard cubic feet per minute,
$O_2$ is the volume percent of oxygen in the flue gas,
$CO_2/CO$ is the volumetric ratio of $CO_2$ to CO in the flue gas, and
$H_2$ is the weight percent of hydrogen in the coke;

producing signals indicative of the values of RA, $O_2$, the ratio of $CO_2$ to CO, and $H_2$ and solving for $C_B$; combining said produced signals $M_R$, $M_G$, CCR, $\dot{C}_G$, $\ddot{C}_G$ and $\dot{C}_B$ in accordance with said CA mathematical relationship to produce said primary indicator signal CA; and (b) regulating at least one of the process variables of feed composition, feed temperature, feed rate, recycle rate, oxygen-containing gas rate, reactor pressure, the amount of catalyst within the system, catalyst activity and catalyst selectivity to keep said primary indicator signal CA as near as possible to a desired value.

8. The process of claim 7, wherein said primary indicator signal CA is kept as near as possible to zero.

9. In a process for the catalytic conversion of a hydrocarbon feed stream wherein said stream, along with at least one recycle stream, is contacted with an active cracking catalyst of definable activity and selectivity for said conversion in a reactor maintained under catalytic conversion conditions of temperature and pressure, said catalyst becoming contaminated by the deposition of coke thereon, and said contaminated catalyst being circulated from said reactor through a regenerator wherein said coke is burned, with the evolution of a flue gas, by contact with an oxygen-containing gas, thereby regenerating the catalyst and elevating its temperature before its return to said reactor, and wherein reaction products are removed from said reactor and are separated into at least one product stream and at least one recycle stream, the improvement in such process which comprises:

(a) producing a primary indicator signal CA indicative of the value of the rate of coke accumulation upon the catalyst in the over-all reactor-regenerator system, said signal representing the mathematical relationship comprised of:

$$CA = \frac{(M_R)(M_G)}{CCR}(\ddot{C}_R) + (M_R + M_G)(\dot{C}_R) - \frac{M_G}{CCR}(\dot{C}_M)$$

wherein $M_R$ is the mass of catalyst in the reactor in pounds,
$M_G$ is the mass of catalyst in the regenerator in pounds,
CCR is the catalyst flow rate through the system in pounds per hour,
$C_R$ is the coke content of the catalyst leaving the reactor in weight fraction,
$\dot{C}_R$ is the first derivative of $C_R$ with respect to time in hours,
$\ddot{C}_R$ is the second derivative of $C_R$ with respect to time in hours,
$C_M$ is the rate of coke make in the reactor in pounds per hour, and
$\dot{C}_M$ is the first derivative of $C_M$ with respect to time in hours;

producing signals indicative of the values of $M_R$, $M_G$, CCR, $\dot{C}_R \ddot{C}_R$ and $\dot{C}_M$; combining said value signals in accordance with said CA mathematical relationship to produce said primary indicator signal CA; and (b) regulating at least one of the process variables of feed composition, feed temperature, feed rate, recycle rate, oxygen-containing gas rate, reactor pressure, the amount of catalyst within the system, catalyst activity and catalyst selectivity to keep said primary indicator signal CA as near as possible to a desired value.

10. The process of claim 9, wherein said primary indicator signal CA is kept as near as possible to zero.

11. In a process for the catalytic conversion of a hydrocarbon feed stream wherein said stream, along with at least one recycle stream, is contacted with an active cracking catalyst of definable activity and selectivity for said conversion, in a reactor maintained under catalytic conversion conditions of temperature and pressure, said catalyst becoming contaminated by the deposition of coke thereon, and said contaminated catalyst being circulated from said reactor through a regenerator wherein said coke is burned, with the evolution of a flue gas, by contact with an oxygen-containing gas, thereby regenerating the catalyst and elevating its temperature before its return to said reactor, and wherein reaction products are removed from said reactor and are separated into at least one product stream and at least one recycle stream, the improvement in such process which comprises producing a primary indicator signal CA indicative of the value of the rate of coke accumulation upon the catalyst in the over-all reactor-regenerator system, said signal derived from the mathematical relationship comprised of:

$$CA = \frac{(M_R)(M_G)}{CCR}(\ddot{C}_G) + (M_R + M_G)(\dot{C}_G) + \frac{M_R}{CCR}(\dot{C}_B)$$

wherein $M_R$ is the mass of catalyst in the reactor in pounds,
$M_G$ is the mass of catalyst in the regenerator in pounds,
CCR is the catalyst flow rate through the system in pounds per hour,
$C_G$ is the coke content of the catalyst leaving the regenerator in weight fraction,
$\dot{C}_G$ is the first derivative of $C_G$ with respect to time in hours,
$\ddot{C}_G$ is the second derivative of $C_G$ with respect to time in hours,
$C_B$ is the rate of coke burning in the regenerator in pounds per hour, and
$\dot{C}_B$ is the first derivative of $C_B$ with respect to time in hours;

producing signals indicative of the values of $M_R$, $M_G$ and CCR; producing signals indicative of the values of $\dot{C}_G$ and $\ddot{C}_G$, wherein $$C_G = 8.81 \times 10^{-7} \frac{RA \, ln\frac{21}{O_2}}{T_G - 1000}$$

and wherein

RA is the oxygen-containing gas flow rate to the regenerator in standard cubic feet per minute,
$O_2$ is the volume percent of oxygen in said flue gas, and
$T_G$ is the temperature within the regenerator in degrees Fahrenheit;

producing signals indicative of the measurement of RA, $O_2$ and $T_G$ and solving for $C_G$, $\dot{C}_G$ and $\ddot{C}_G$; producing a signal indicative of the value of $C_B$ wherein $$C_B = \frac{RA[39.9 - 1.9(O_2)]}{\frac{100 - H_2}{1 + \frac{CO_2}{CO}}\left[\frac{CO_2}{CO} + 0.5(1 + 0.01\ O_2)\right] + 3H_2(1 + 0.01\ O_2)}$$

wherein $H_2$ is the weight percent of hydrogen in the coke, and $CO_2/CO$ is the ratio of $CO_2$ to CO in said flue gas;

producing signals indicative of the values of RA, $O_2$, $H_2$ and the ratio of $CO_2$ to CO and solving for $\dot{C}_B$, combining said produced signals $M_R$, $M_G$, CCR, $\dot{C}_G$, $\ddot{C}_G$ and $\dot{C}_B$, in accordance with said CA mathematical relationship to produce said primary indicator signal CA, and regulating at least one of the process variables of feed composition, feed temperature, feed rate, recycle rate, oxygen-containing gas rate, reactor pressure, the amount of catalyst within the system, catalyst activity and catalyst selectivity to keep said primary indicator signal CA as near as possible to a desired value.

12. The process of claim 11, wherein said primary indicator signal CA is kept as near as possible to zero.

References Cited by the Examiner
UNITED STATES PATENTS

| | | | |
|---|---|---|---|
| 2,982,717 | 5/1961 | Waddill | 196—132 |
| 3,175,968 | 3/1965 | Berger | 208—164 |

DELBERT E. GANTZ, *Primary Examiner.*

ALPHONSO D. SULLIVAN, PAUL M. COUGHLAN,
*Examiners.*

P. P. GARVIN, H. LEVINE, *Assistant Examiners.*